US006813383B1

United States Patent
Sakurai (10) Patent No.: US 6,813,383 B1
(45) Date of Patent: Nov. 2, 2004

(54) LINEAR MARK DETECTING METHOD AND DEVICE

(75) Inventor: Kazuyuki Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/763,056

(22) PCT Filed: Aug. 13, 1999

(86) PCT No.: PCT/JP99/04398

§ 371 (c)(1),
(2), (4) Date: Feb. 16, 2001

(87) PCT Pub. No.: WO00/10127

PCT Pub. Date: Feb. 24, 2000

(30) Foreign Application Priority Data

Aug. 17, 1998 (JP) ............................................ 10-230583

(51) Int. Cl.[7] ............................ G06K 9/46; G06K 9/00; G06K 9/48
(52) U.S. Cl. ...................... 382/202; 382/104; 382/106; 382/107; 382/108; 382/199
(58) Field of Search ................................ 382/106–108, 382/104, 260–265, 274, 281, 199, 291; 701/44; 348/135, 137

(56) References Cited

U.S. PATENT DOCUMENTS

| 4,819,169 | A | * | 4/1989 | Saitoh et al. | ................. | 701/28 |
|---|---|---|---|---|---|---|
| 5,301,115 | A | * | 4/1994 | Nouso | ......................... | 701/300 |
| 5,430,810 | A | * | 7/1995 | Saeki | ......................... | 382/281 |
| 5,790,403 | A | * | 8/1998 | Nakayama | ................... | 701/28 |
| 5,922,036 | A | * | 7/1999 | Yasui et al. | ................... | 701/28 |
| 5,991,427 | A | * | 11/1999 | Kakinami et al. | .......... | 382/104 |
| 6,091,833 | A | * | 7/2000 | Yasui et al. | ................. | 382/104 |
| 6,111,993 | A | * | 8/2000 | Matsunaga | ................. | 382/281 |
| 6,493,458 | B2 | * | 12/2002 | Yasui et al. | ................. | 382/104 |

FOREIGN PATENT DOCUMENTS

| JP | 4-311211 | 11/1992 |
|---|---|---|
| JP | 10-47923 | 2/1998 |

* cited by examiner

Primary Examiner—Samir Ahmed
Assistant Examiner—Brian Le
(74) Attorney, Agent, or Firm—Foley & Lardner LLP (57) ABSTRACT

Only points on a linear mark image is detected as linear mark characteristic points without influence of surrounding structures and noise, so that reliability is improved on detecting a linear mark.

As shown in FIG. 1, the present invention is provided with a white-line inside/outside luminance difference computing means 102, a white-line end edge intensity computing means 103, a white-line internal luminance uniformity computing means 104, and a white-line characteristic integrating means 105. A plurality of characteristics including a difference in luminance between the inside and the outside of a white line, edge intensity, and uniformity of luminance in a white line are integrated to compute a likelihood of a white-line.

10 Claims, 5 Drawing Sheets

H: HEIGHT OF CAMERA
ΔX: WHITE-LINE WIDTH IN ACTUAL SPACE

FIG. 6

LINEAR MARK DETECTING METHOD AND DEVICE

TECHNICAL FIELD

The present invention relates to a detecting method of a linear mark and a detector. The present invention particularly relates to a detecting method of a linear mark and a detector, which allows a linear mark characteristic point to be detected without confusion with surrounding structure and noise, for example, which is suitable for detecting a white line in an image of a road.

BACKGROUND ART

A conventional linear mark detector is disclosed in Japanese Patent Laid-Open No. HEI 10-47923.

Figure 6:
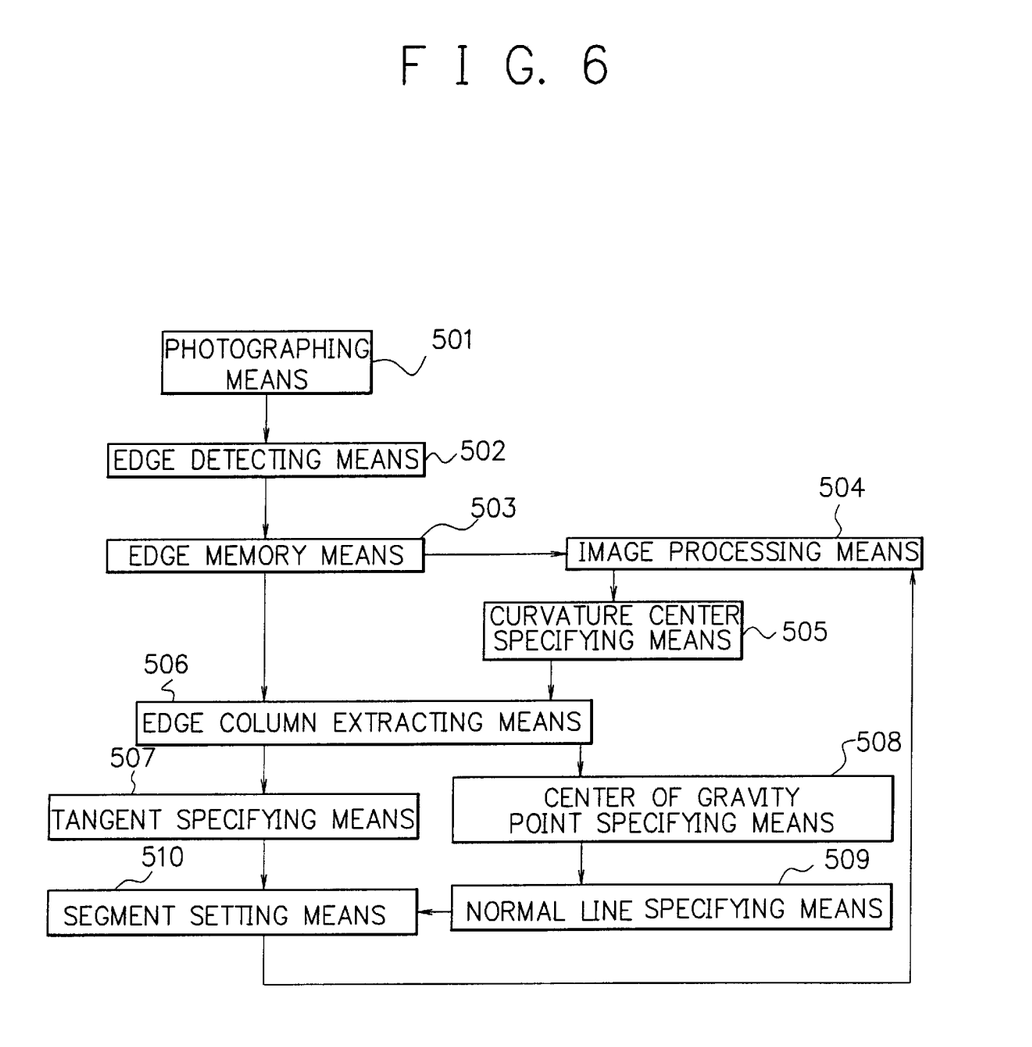
FIG. 6 is a block diagram showing a configuration of a conventional linear mark detector.

FIG. 6 is a block diagram showing a configuration of the conventional linear mark detector. The linear mark detector is constituted by an image pickup means 501, an edge detecting means 502, an edge memory means 503, an image processing means 504, a curvature center specifying means 505, an edge column extracting means 506, a tangent line specifying means 507, a center of gravity specifying means 508, a normal line specifying means 509, a segment setting means 510 and so on.

The image pickup means 501 picks up an image of a road surface and produces image information including boundaries of both sides of a lane, which is provided on the road surface to be detected.

The edge detecting means 502 detects edges based on intensities of the image information and successively outputs edges representing the boundaries of both sides.

The edge memory means 503 successively stores the edges representing the boundaries of both sides outputted by the edge detecting means 502 and forms continuous edge groups in two columns representing the boundaries of both sides.

The image processing means 504 specifies the boundaries of both sides on a three-dimensional plain surface at least based on the edge groups arranged in two columns.

The curvature center specifying means 505 specifies a curvature center relative to the boundaries of both sides based on the previous image, in which the boundaries of both sides are specified.

The edge column extracting means 506 extracts a pair of edge columns respectively by predetermined lengths along a concentric circle whose center conforms to the curvature center. The extraction is made from the continuous edge groups arranged in two columns. The edge groups have been additionally stored by the edge memory means 503 and represent the boundaries of both sides.

The tangent specifying means 507 specifies a pair of tangents respectively relative to the edge columns in the case where a pair of the edge columns extracted by the edge column extracting means 506 are in parallel with each other.

The center of gravity specifying means 508 specifies a center of gravity of the edge groups constituting a pair of the edge columns extracted by the edge column extracting means 506.

The normal line specifying means 509 specifies a normal line passing through the center of gravity relative to a pair of the tangents.

The segment setting means 510 specifies intersection points of the normal line and a pair of the tangents. The segment setting means 510 sets a line segment between a pair of the intersection points as a segment of the lane and outputs the segment to the image processing means 504.

The following will be described an operation as below.

The edge detecting means 502 detects edges representing the boundaries of both sides based on intensities of the image information including the boundaries of both sides of the lane, which is provided on the road surface to be detected. The edge memory means 503 successively stores the edges into an edge memory.

Further, the continuous edge groups in two columns are formed, which represent the boundaries of both sides. The image processing means 504 specifies the boundaries of both sides on the three-dimensional plain surface at least based on the edge groups arranged in two columns. The curvature center specifying means 505 specifies a curvature center relative to the boundaries of both sides based on the previous image, in which the boundaries of both sides are specified.

Next, the edge column extracting means 506 extracts a pair of the edge columns respectively by predetermined lengths along a concentric circle whose center conforms to the curvature center. The extraction is made from the continuous edge groups arranged in two columns. The edge groups have been additionally stored into the edge memory and represent the boundaries of both sides.

And then, the tangent specifying means 507 specifies a pair of tangents respectively for the edge columns in the case where a pair of the extracted edge columns is in parallel with each other. Moreover, the center of gravity specifying means 508 specifies a center of gravity of the edge groups constituting a pair of the extracted edge columns.

Further, the normal line specifying means 509 specifies a normal line which is passing through the center of gravity, relative to a pair of the tangents.

Finally, intersection points of the normal line and a pair of the tangents are specified. And then, the segment setting means 510 sets a line segment between a pair of the intersection points as a segment of the lane, and the image for specifying the boundaries of both sides is updated according to the segment.

Problems to be Solved by the Invention

The conventional linear mark detector has the above-mentioned configuration, in which only edges are detected as a boundary. However, the edges exist due to a variety of surrounding configurations and noise as well as linear mark boundaries. It is therefore difficult to clearly distinguish the linear mark boundaries from such configurations and noise. Consequently, the linear mark boundaries cannot be detected with reliability.

An object of the present invention is to provide a detecting method of a linear mark and a detector, by which a linear mark can be detected without the influence of the surrounding configurations and noise.

Means for Solving the Problems

A linear mark detecting method according to the present invention is characterized by including a computing step of computing characteristic values such as a difference in luminance value between the inside and the outside of a linear mark region, edge intensity at an end of a linear mark, and uniformity of luminance in the linear mark, for each point in an inputted target image; and an evaluation value giving step of giving to each point in the target image an evaluation value, which is indicative of a likelihood of a linear mark characteristic point for detecting the linear mark, based on each of the characteristic values computed in the computing step.

A linear mark detector according to the present invention is characterized by including an image input means for inputting a target image, an image processing means for computing characteristic values such as a difference in luminance value between the inside and the outside of a linear mark region, edge intensity at an end of the linear mark, and uniformity of luminance in the linear mark, for each point in the target image inputted by the image input means; a linear mark characteristic integrating means for giving to each point in the target image an evaluation value, which is indicative of a likelihood of a linear mark characteristic point for detecting a linear mark, based on each of the characteristic values computed by the image processing means; and a linear mark characteristic point data output means for outputting the evaluation value indicative of a likelihood of a linear mark characteristic point, the value being added to each of the points by the linear mark characteristic integrating means.

According to the linear mark detecting method and the detector of the present invention, computation is conducted on characteristic values such as a difference in luminance value between the inside and the outside of a linear mark region, edge intensity at an end of the linear mark, and uniformity of luminance in the linear mark, for each point in the above target image. Based on each of the computed characteristic values, an evaluation value indicative of a likelihood of a linear mark characteristic point is attached to each point in the above target image, determination is made on the linear mark based on the evaluation value, and the linear mark is detected while eliminating the influence of the surrounding configurations and noise. Consequently, it is possible to improve reliability of detecting a linear mark.

In FIGS. 1 to 6, reference numerals denote as follows. 100—a road image input means (image input means), 101—white-line image width determining means (linear mark image width determining means), 102—white-line inside/outside luminance difference computing means (image processing means), 103—white-line end edge intensity computing means (image processing means), 104—white-line internal luminance uniformity computing means (image processing means), 105—white-line characteristic integrating means (linear mark characteristic integrating means), 106—white-line characteristic point data output means (linear mark characteristic point data output means), step A2, step B2 (linear mark image width determining step), step A3, step B3 (computing step), step A4, step B4 (computing step), step A5, step B5 (computing step), step A6, step B6 (computing step), step A7, step B7 (computing step), and step A8 and step B8 (evaluation value attaching step).

Best Mode for Carrying Out the Invention

Referring to figures, the following will be described an embodiment of the present invention in detail.

Figure 1:
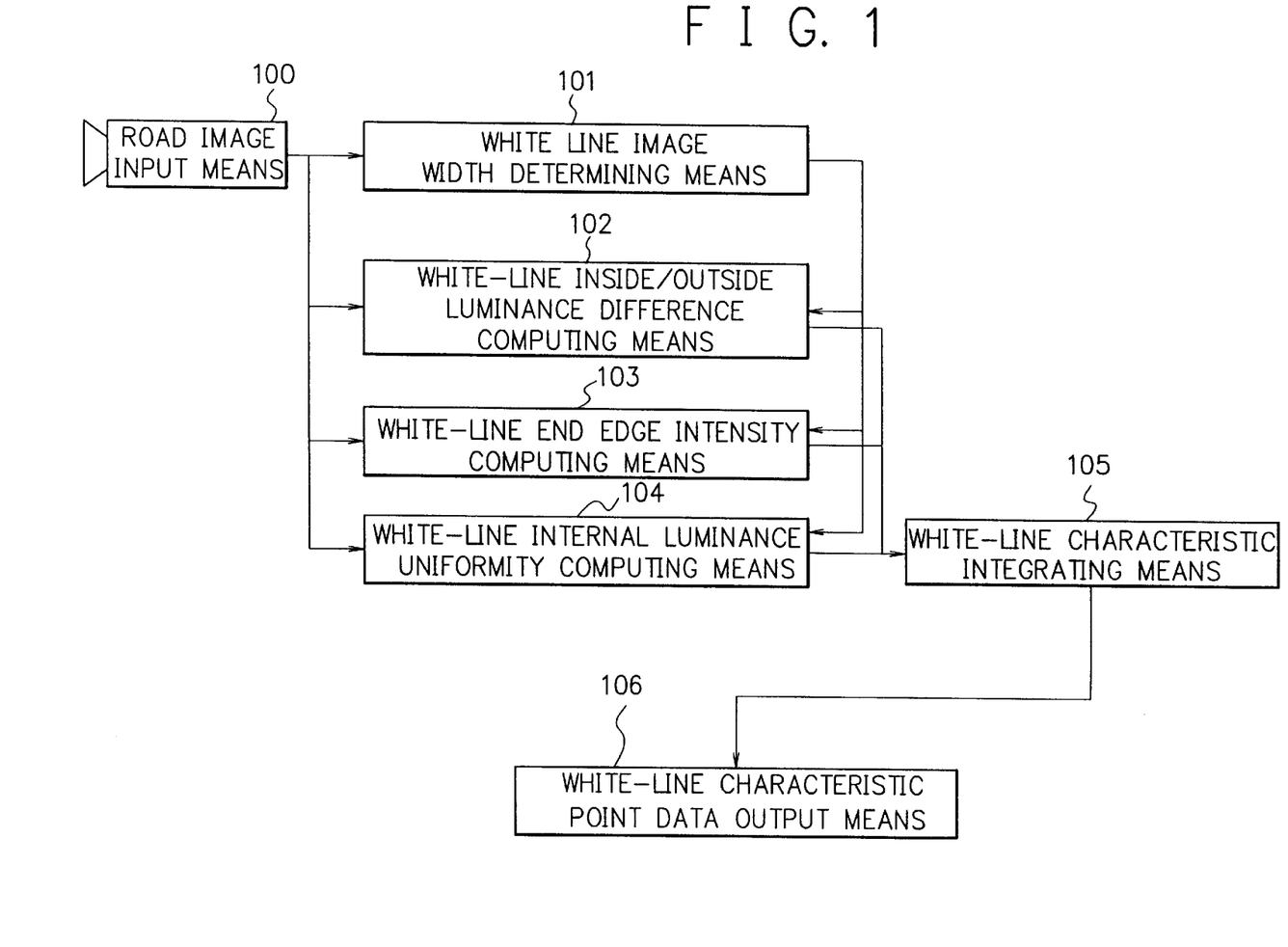
FIG. 1 is a block diagram showing a configuration of a linear mark detector for realizing a linear mark detecting method according to an embodiment of the present invention.

FIG. 1 is a block diagram showing the configuration of a linear mark detector for realizing a linear mark detecting method of the embodiment according to the present invention.

Here, the following will discuss the case where a white line on a road is detected.

The linear mark detector is provided with a road image input means (image input means) 100, a white-line image width determining means (linear mark image width determining means) 101, a white-line inside/outside luminance difference computing means (image processing means) 102, a white-line end edge intensity computing means (image processing means) 103, a white-line internal luminance uniformity computing means (image processing means) 104, a white-line characteristic integrating means (linear mark characteristic integrating means) 105, and a white-line characteristic point data output means (linear mark characteristic point data output means) 106.

The road image input means 100 inputs a road image.

The white-line image width determining means 101 determines a width of an image at each point on a road image based on its ordinate in the case where a white line image exists on the point.

The white-line inside/outside luminance difference computing means 102 computes a difference in luminance value between the inside and the outside of a white line region based on a position and a width of the white line image, the width being determined at each point on the road image by the white-line image width determining means 101.

The white-line end edge intensity computing means 103 computes edge intensity at an end of a white line based on a width of the white line image, the width being determined at each point on the road image by the white-line image width determining means 101.

The white-line internal luminance uniformity computing means 104 computes uniformity of luminance in a white line based on a width of the white line image, the width being determined at each point on the road image by the white-line image width determining means 101.

The white-line characteristic integrating means 105 integrates characteristic values computed by the white-line inside/outside luminance difference computing means 102, the white-line end edge intensity computing means 103, and the white-line internal luminance uniformity computing means 104. And the white-line characteristic integrating means 105 gives an evaluation value indicative of a likelihood of a white-line characteristic point to each point in the road image.

The white-line characteristic point data output means 106 outputs the evaluation value.

Figure 2:
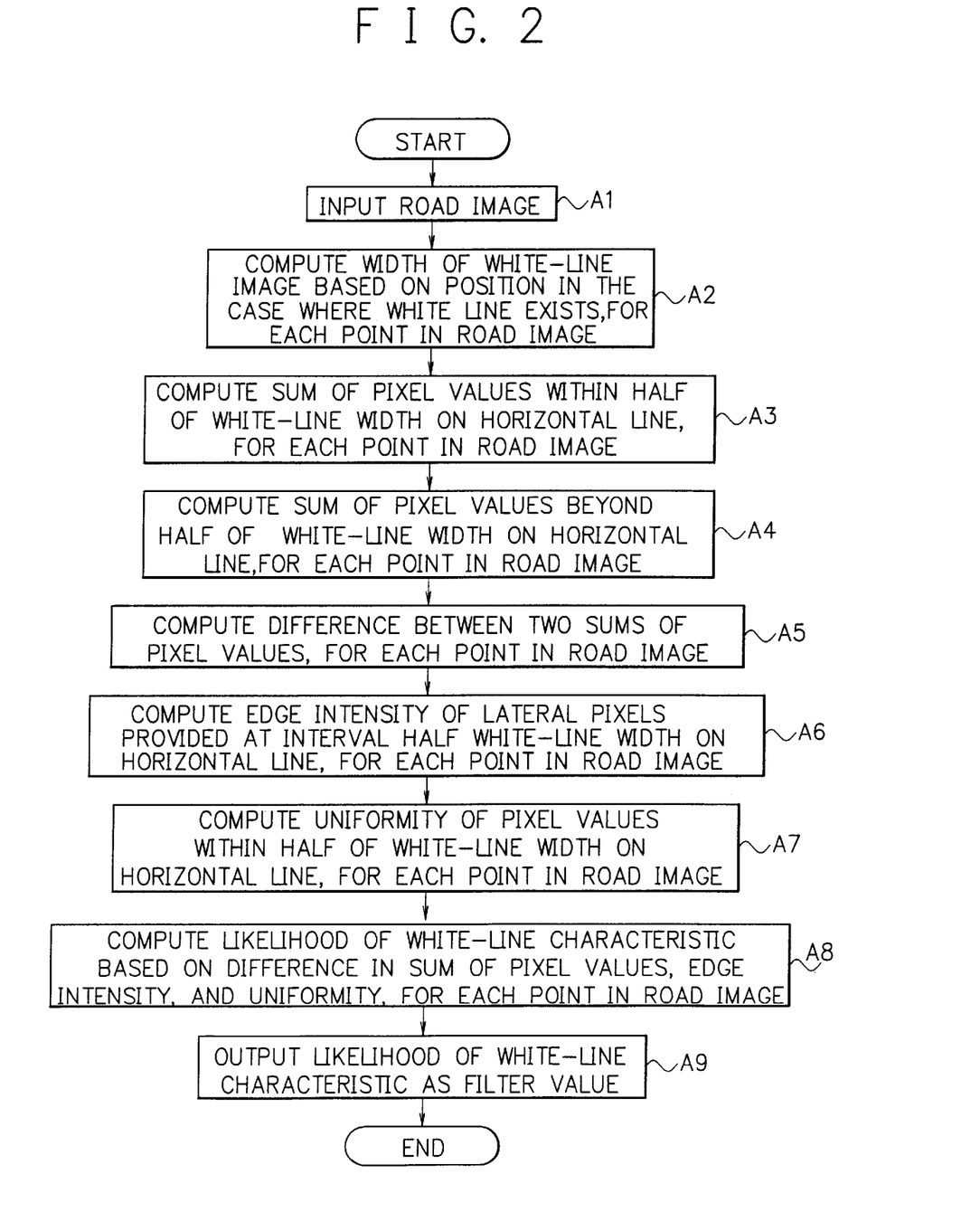
FIG. 2 is a flowchart showing the linear mark detecting method and the operation of the detector according to an embodiment of the present invention.

Referring to the flowcharts of FIGS. 1 and 2, the following will describe the detail of a linear mark detecting method and the operation of the detector according to this embodiment.

First, a road image is inputted by the road image input means 100 (step A1).

Next, for each point in the road image, the white-line image width determining means 101 computes a width of a white-line image based on a position, particularly on an ordinate of the point, in the case where a white line exists (step A2, white-line image width determining step). Moreover, for each point in the road image, the white-line inside/outside luminance difference computing means 102 computes a sum of luminance values of pixels in a closer range within a half of the width of the white-line image, of pixels provided on the same horizontal line (step A3, computing step). In the same manner, a sum of luminance values is computed on pixels in a longer range beyond a half of the width of the white-line image and within the width, of pixels provided on the same horizontal line (step A4, computing step).

Figure 4:
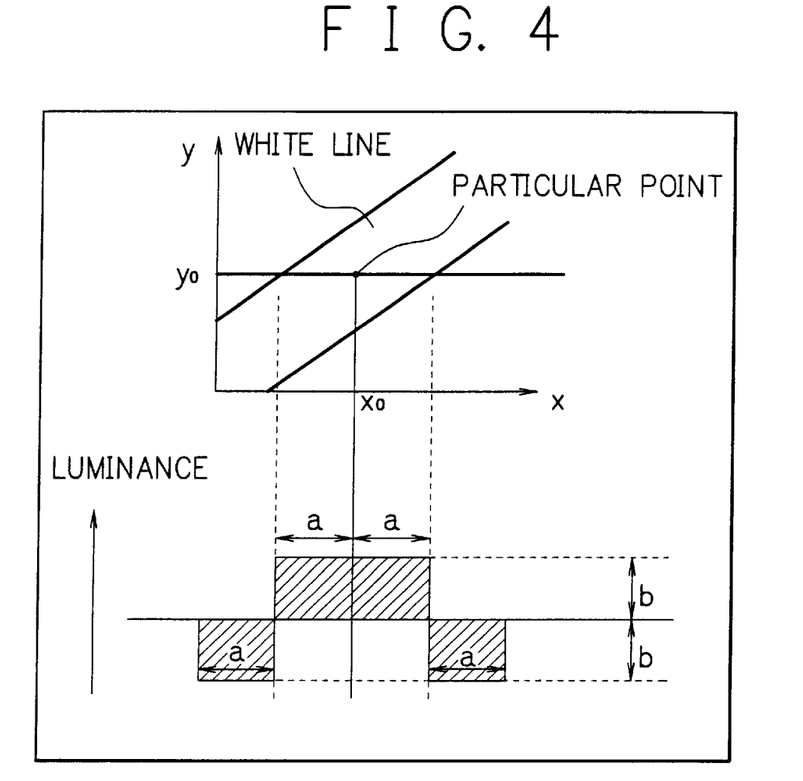
FIG. 4 is an explanatory drawing schematically showing the operation of a white-line inside/outside luminance difference computing means of the linear mark detector according to an embodiment of the present invention.

And then, for each point in the road image, computation is performed on a "difference" between the sum of luminance values on the closer range, the sum being computed in the step A3, and the sum of luminance values on the longer range, the sum being computed in the step A4, as shown in FIG. 4 (step A5, computing step).

Next, for each point in the road image, the white-line end edge intensity computing means 103 computes edge intensity of two pixels provided at an interval half a width of the lateral white-line image on the same horizontal line (step A6, computing step).

Moreover, for each point in the road image, the white-line internal luminance uniformity computing means 104 computes uniformity of luminance values on a group of pixels, which are within a half of a width of the lateral white-line image on the same horizontal line (step A7, computing step).

Subsequently, for each point in the road image, the white-line characteristic integrating means 105 computes a likelihood of a white-line characteristic point based on a "difference" in luminance value that is computed in the step A5, the edge intensity computed in the step A6, and the uniformity of internal pixels that is computed in the step A7 (step A8, evaluation value attaching step).

Finally, the white-line characteristic point data output means 106 outputs the likelihood of a white-line characteristic point as a filter value (step A9).

Therefore, the above-mentioned embodiment directly uses a difference in luminance value between the inside and the outside of a white line, the difference being the most outstanding characteristic of a white line. Thus, it is possible to detect only a white-line characteristic point with reliability as compared with using a characteristic such as an edge.

Additionally, a likelihood of a white-line can be computed and quantified based on a plurality of characteristics including a "difference" in sum of inside/outside luminance values, edge intensity, and uniformity of internal pixels. Hence, it is possible to reliably detect a white-line characteristic point without fail even if the point is less distinguishable with a single characteristic.

With a specific example, the following will describe a linear mark detecting method and the operation of the detector according to this embodiment.

Figure 3:
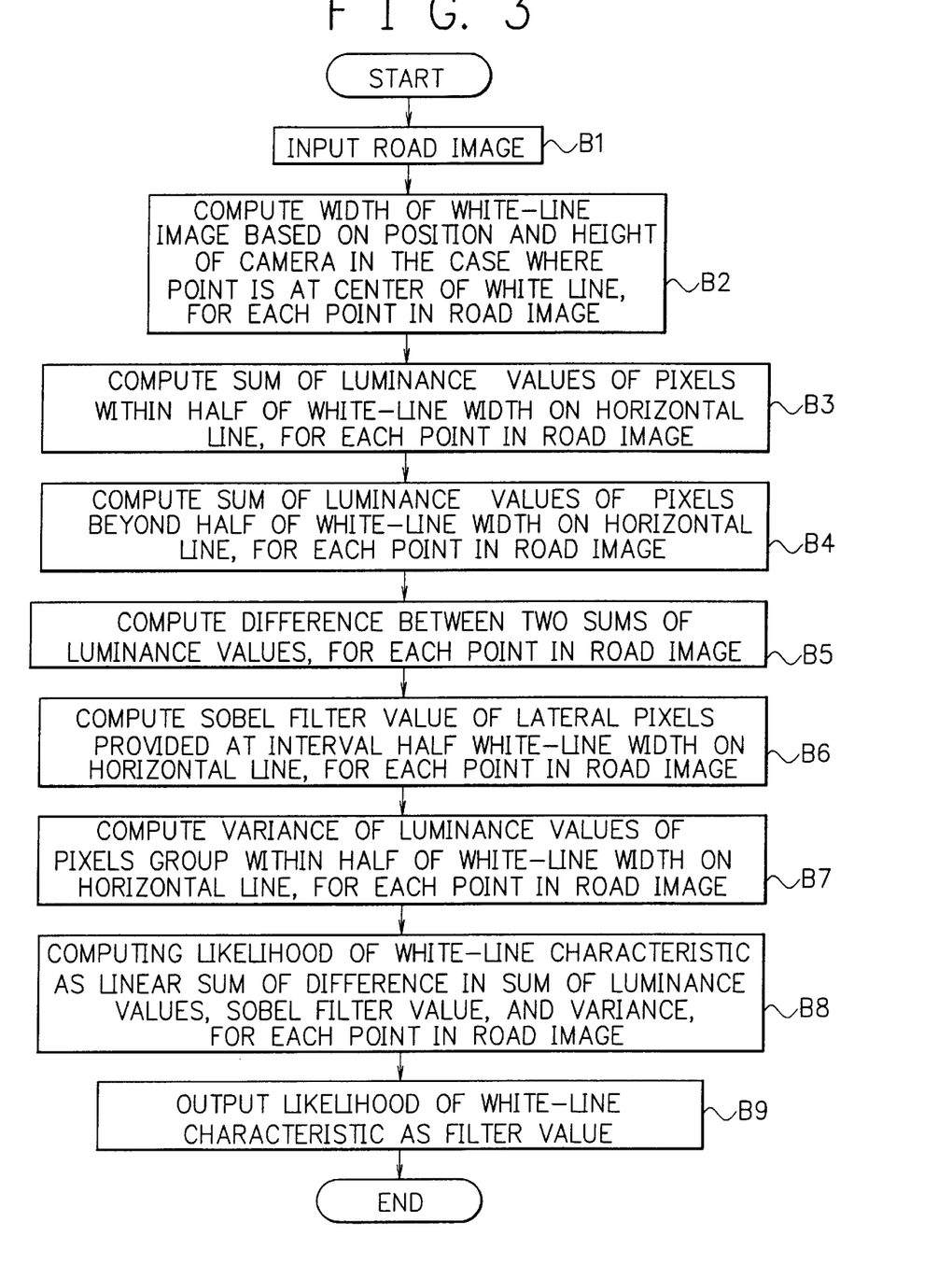
FIG. 3 is a flowchart showing a specific example of the operation of the linear mark detector according to an embodiment of the present invention.

FIG. 3 is a flowchart showing the specific operating steps of detecting a linear mark according to this embodiment.

First, the road image input means 100 inputs a road image (step B1).

Next, for each point in the road image, the white-line image width determining means 101 computes a width W of a white-line image according to $W = \Delta X(z-V)/H$ in the case where each point in the road image is provided on a center line of the white line, based on a position of the point and a height of a camera (step B2, white-line image width determining step).

Figure 5:
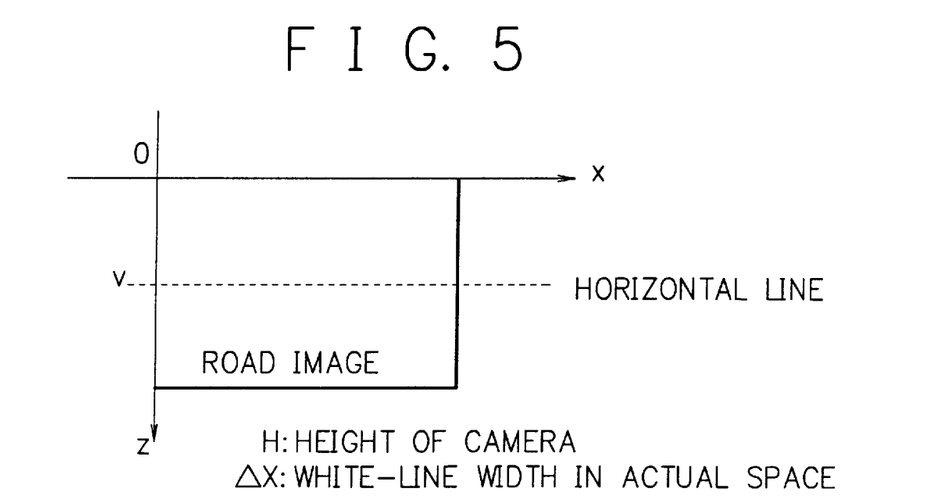
FIG. 5 is an explanatory drawing showing a camera coordinate system and variables for computation of a width of a white-line image in a white-line image width determining means of the linear mark detector according to an embodiment of the present invention.

However, coordinate system of the camera and variables are shown in FIG. 5. Reference character H denotes a height of the camera, and reference character $\Delta X$ denotes a width of a white line in an actual space.

Furthermore, for each point in the road image, the white-line inside/outside luminance difference computing means 102 computes a sum of luminance values on pixels in a closer range within a half of the width of the white-line image, of pixels provided on the same horizontal line (step B3, computing step). In the same manner, a sum of luminance values is computed on pixels in a longer range beyond a half of the width of the white-line image and within the width, of pixels provided on the same horizontal line (step B4, computing step). And then, for each point in the road image, computation is performed on a "difference" between the sum of luminance values on the closer range, the sum being computed in the step B3, and the sum of luminance values on the longer side, the sum being computed in the step B4 (step B5, computing step). At this moment, the closer range and the longer range are equal to each other in the number of the pixels.

And then, for each point in the road image, the white-line end edge intensity computing means 103 computes edge intensity of two pixels provided on the same horizontal line at an interval half a width of a lateral white-line image. For example, the intensity is computed as a pixel value when applying the Sobel filter onto an original road image (step B6, computing step).

Further, for each point in the road image, the white-line internal luminance uniformity computing means 104 computes uniformity of luminance values of a group of pixels, which are within a half of a width of a lateral white-line image on the same horizontal line. For example, computation is conducted on variance of luminance values in the group of pixels, or a difference between a maximum luminance value and a minimum luminance value and so on (step B7, computing step).

Subsequently, for each point in the road image, the white-line characteristic integrating means 105 computes a likelihood of a white-line characteristic point. For example, the likelihood is computed as a linear sum of the "difference" in sum of inside/outside luminance values, the Sobel filter value, and the variance of luminance values in the internal pixel group (step B8, evaluation value attaching step).

Finally, the white-line characteristic point data output means 106 outputs the likelihood of a white-line characteristic point as a filter value (step B9).

As mentioned above, according to this embodiment, as compared with determining a white-line image by detecting an edge, a "difference" in sum of white-line inside/outside luminance values is mainly used, by which a white line can be readily distinguished from other similar parts. Additionally, a likelihood of a white-line characteristic point is computed based on a plurality of combined characteristics including edge intensity at an end of a white-line image and uniformity of luminance values in a white-line image. Consequently, it is possible to detect a white-line characteristic point on a white-line image in the road image in a more accurate and reliable manner, thereby providing a linear mark detecting method and a detector that permits reliable detection of a white line on a road surface.

Although the above description discussed the detection of a white line on a road, the detection is not limited to a road as long as a white line is detected.

Moreover, although the above description discussed the detection of a white line, a mark is not limited to a white line as long as a linear mark is detected. The detection can be also made on linear marks having other colors such as yellow, red, and green.

INDUSTRIAL APPLICABILITY

As mentioned above, according to the present invention, a "difference" in luminance values between the inside and the outside of a linear mark image is used as a characteristic value for readily distinguishing a linear mark from other similar parts. Further, with combination of a plurality of characteristic values such as edge intensity at an end of the linear mark image and uniformity of luminance values in the linear mark image, an evaluation value on a likelihood of a linear mark characteristic point is computed for each point in the above target image. Thus, detection is accurately made on linear mark characteristic points on the linear mark image in the target image, and a linear mark is detected based on the characteristic points. Consequently, it is possible to improve reliability on detecting a linear mark while eliminating the influence of the surrounding configurations and noise.

What is claimed is:

1. A linear mark detecting method, in which a target image is inputted and a linear mark is detected based on said inputted target image, comprising:

a computing step of computing characteristic values including at least a difference in luminance values between an inside and an outside of a linear mark region, edge intensity at an end of said linear mark, and uniformity of luminance in said linear mark, for each point in said inputted target image, an evaluation value attaching step of attaching to each point in said target image an evaluation value indicative of a likelihood of a linear mark characteristic point for detecting said linear mark, based on each of the characteristic values computed in said computing step, and a linear mark image width determining step of determining a width of said linear mark image in the case where a linear mark image exists, for each point in said inputted target image, and wherein:

in said computing step of computing a characteristic value of edge intensity at an end of said linear mark, a characteristic value of edge intensity at an end of said linear mark is computed based on the width of said linear mark image, said width being determined in said linear mark image width determining step, for each point in said target image, and in said computing step of computing a characteristic value such a uniformity of luminance in said linear mark, a characteristic value of luminance uniformity in said linear mark is computed based on the width of said linear mark image, for each point in said target image, said width being determined in said linear mark image width determining step in said computing step of computing a characteristic value of a difference in luminance values between the inside and the outside of said linear mark region, a characteristic value of a difference in luminance values between the inside and the outside of said linear mark region is computed based on a position of each point on said target image and said width of said linear mark image; and wherein in said computing step of computing a characteristic value of a difference in luminance values between the inside and the outside of said linear mark region, for each point in said target image, a sum of luminance value is computed for pixels in a relatively close range within a half of the width of said linear mark image, of pixels provided on the same horizontal line, a sum of luminance values is computed for pixels in a relatively long range beyond a half of the width of said linear mark image and within said width, of pixels provided on the same horizontal line, said difference is computed between the sum of luminance values on the closer range and the sum of luminance values on the longer range for each point in said target image, and the characteristic value is computed on said difference in luminance values between the inside and the outside of said linear mark region.

2. The linear mark detecting method claimed in claim 1, characterized in that in said linear mark image width determining step, for each point in said target image, the width of a linear mark image is determined based on a position of the point and a height of a camera in the case where each point in said target image is provided on a center line of said linear mark, in said computing step of computing a characteristic value of edge intensity at an end of said linear mark, for each point in said target image, a characteristic value is computed on edge intensity of two pixels provided at an interval half of the width of said linear mark image on the same horizontal line, said characteristic value being computed as a pixel value for applying the Sobel filter onto an original target image based on the width of said linear mark image, said width being determined in said linear mark image width determining step, and in said computing step of computing a characteristic value such as uniformity of luminance in said linear mark, for each point in said target image, a characteristic value is computed on uniformity of luminance values of a group of pixels being within a half of the width of said linear mark image on the same horizontal line by computing variance of luminance values in said pixel group.

3. The linear mark detecting method claimed in claim 2 characterized in that in said computing step of computing a characteristic value such as uniformity of luminance in said linear mark, for each point in said target image, a characteristic value is computed on uniformity of luminance values of the pixel group bring within a half of the width of said linear mark image on the same horizontal line by computing a difference between a maximum luminance value and a minimum luminance value in said pixel group.

4. The linear mark detecting method as claimed in claim 1, characterized in that in said computing step of computing a characteristic value such as uniformity of luminance in said linear mark, for each point in said target image, a characteristic value is computed on uniformity of luminance values of the pixel group being within a half of a width of said linear mark image on the same horizontal line by computing a difference between a maximum luminance value and a minimum luminance value in said pixel group.

5. The linear mark detecting method claimed in claim 1, characterized in that in said linear mark image width determining step, for each point in said target image, the width of a linear mark image is determined based on a position of the point and a height of a camera in the case where each point in said target image is provided on a center line of said linear mark, in said computing step of computing a characteristic value of edge intensity at an end of said linear mark, for each point in said target image, a characteristic value is computed on the basis of edge intensity of two pixels provided at an interval half of the width of said linear mark image on the same horizontal line, said characteristic value being computed as a pixel value for applying the Sobel filter onto an original target image based on the width of said linear mark image, said width being determined in said linear mark image width determining step, and in said computing step of computing a characteristic value of the uniformity of luminance in said linear mark, for each point in said target image, a characteristic value is computed based on uniformity of luminance values of a group of pixels being within a half of the width of said linear mark image on the same horizontal line by computing variance of luminance values in said pixel group.

6. The linear mark detecting method claimed in claim 5 characterized in that in said computing step of computing a characteristic value such as uniformity of luminance in said linear mark, for each point in said target image, a characteristic value is computed on uniformity of luminance values of the pixel group bring within a half of the width of said linear mark image on the same horizontal line by computing a difference between a maximum luminance value and a minimum luminance value in said pixel group.

7. The linear mark detecting method claimed in claim 1, characterized in that in said computing step of computing a characteristic value such as uniformity of luminance in said linear mark, for each point in said target image, a characteristic value is computed on uniformity of luminance values of the pixel group bring within a half of the width of said linear mark image on the same horizontal line by computing a difference between a maximum luminance value and a minimum luminance value in said pixel group.

8. The linear mark detecting method claimed in claim 1, wherein:

said target image includes images of road, and said linear mark is a line which defines a lane.

9. A linear mark detector for inputting a target image and detecting a linear mark based on said inputted target image, comprising:

an image input means for inputting a target image, an image processing means for computing a characteristic value such as a difference in luminance values between an inside and an outside of a linear mark region, edge intensity at an end of said linear mark, and uniformity of luminance in said linear mark, for each point in said target image inputted by said image input means, said difference in luminance values being computed based a first sum of luminance values computed for pixels in a relatively close range within a half of a width of said linear mark image, of pixels provided on the same horizontal line, and a second sum of luminance values computed for pixels in a relatively long range beyond a half of the width of said linear mark image and within said width, of pixels provided on the same horizontal line, said difference computed between said first and second sums for each point in said target image, and the characteristic value is computed on said difference in luminance values between the inside and the outside of said linear mark region, a linear mark characteristic integrating means for attaching to each point in said target image an evaluation value indicative of a likelihood of a linear mark characteristic point for detecting a linear mark, based on said characteristic values computed by said image processing means, and a linear mark characteristic point data output means for outputting an evaluation value indicative of a likelihood of a linear mark characteristic point, said evaluation value being attached by said linear mark characteristic integrating means to each of said points.

10. The linear detector claimed in claim 9 further comprising:

linear mark image width determining means for determining the width of said linear mark image in the case where a linear mark image exists, for each point in said target image inputted by said image input means, said detector being characterized in that:

said image processing means including linear mark inside/outside luminance difference computing means for computing a characteristic value of a difference in luminance value between the inside and the outside of the linear mark region, linear mark end edge intensity computing means for computing a characteristic value of edge intensity at an end of said linear mark, and linear mark internal luminance uniformity computing means for computing a characteristic value such as uniformity of luminance in said linear mark, said linear mark end edge intensity computing means computing a characteristic value of edge intensity at an end of said linear mark based on the width said linear mark image, said width being determined by said linear mark image width determining means, for each point in said target image, said linear mark internal luminance uniformity computing means computing a characteristic value of luminance uniformity in said linear mark based on the width of said linear mark image, said width being determined by said linear mark image width determining means, for each point in said target image.

* * * * *